United States Patent [19]

Miller

[11] Patent Number: 4,799,657

[45] Date of Patent: Jan. 24, 1989

[54] SWING CLAMP

[75] Inventor: Douglas P. Miller, New Berlin, Wis.

[73] Assignee: Applied Power Inc., Butler, Wis.

[21] Appl. No.: 125,008

[22] Filed: Nov. 24, 1987

[51] Int. Cl.[4] .................................................. B23Q 3/08

[52] U.S. Cl. .......................................... 269/24; 269/27

[58] Field of Search ........................ 269/20, 24, 27, 29, 269/32, 33; 92/33

[56] References Cited

U.S. PATENT DOCUMENTS

| | | | |
|---|---|---|---|
| 3,173,673 | 3/1965 | Northern et al. | 269/32 |
| 3,362,301 | 1/1968 | Kohlitz | 92/2 |
| 3,457,838 | 7/1969 | Rowe | 92/33 |
| 3,572,216 | 3/1971 | Sessody | 92/33 |
| 3,605,569 | 9/1971 | Sessody | 92/33 |
| 3,948,502 | 4/1976 | Waller et al. | 269/27 |
| 4,265,434 | 5/1981 | Hamilton et al. | 269/27 |
| 4,351,516 | 9/1982 | Ersoy et al. | 269/27 |
| 4,560,152 | 12/1985 | Miller | 269/24 |

*Primary Examiner*—Eugene R. Laroche
*Assistant Examiner*—Robert J. Pascal
*Attorney, Agent, or Firm*—John C. Cooper, III; Fred Wiviott; C. Thomas Sylke

[57] ABSTRACT

A powered work clamping device including a housing with an upper and lower chamber and an intermediate chamber communicating with the upper and lower chambers, an upper and lower piston respectively residing in the upper and lower chambers, and wherein the lower piston has a section with reduced diameter slidably and rotatably operating in the intermediate chamber, an index rod projects from the lower piston into an index bore in the upper piston and a piston rod connected thereto. The piston rod projects from the housing and is secured to a work-engaging head. The head is rotatable and independently extendable depending upon operation of the upper and lower pistons and means for rotating the lower piston and actuated upon operation of a check valve served by one of two independently actuated two-stage directional control valves.

10 Claims, 6 Drawing Sheets

SWING CLAMP

BACKGROUND OF THE INVENTION

1. Field of the Invention

The present invention relates to work holders, and more particularly to a swing clamp for holding a workpiece.

2. Description of the Prior Art

Powered work clamping devices, or swing clamps, are typically used on machine tools to hold a workpiece on a table or jig while a mechanical operation such as milling, drilling or grinding is performed. Swing clamps may be manually, hydraulically or pneumatically powered.

Swing clamps typically are controlled by solenoid actuated, two-position flow control valves for controlling the flow of fluid to and from the clamp. A single control valve was disclosed and claimed in U.S. Pat. No. 4,560,152 assigned to the same assignee as the present invention. In general, prior clamps relied on motion of a rotatable piston in opposed axial directions concurrently with rotation of a work-engaging head secured to the piston. The present invention operates from independently operated, solenoid actuated, two-position valves which alternatively act upon swing clamp components to provide independent axial motion of the plunger relative to rotational motion of the work-engaging head.

The principal advantage provided by the clamp of U.S. Pat. No. 4,560,152 was that the working head plunger extended and rotated 90 degrees with only ne "on" signal and with only one control port, thus simplifying plumbing and providing flat rotation of the working head.

Several additional patents known to the present inventor will now be described, it being apparent from the descriptions that the independent relative axial and rotational motion of the work-engaging heads described therein has not been taught nor suggested by any of the prior art devices.

A device comprising a pivoted lever and power means for actuating the same is disclosed in the Northern et al U.S. Pat. No. 3,173,673 granted Mar. 16, 1965 in which a pivoted lever and power means for actuating the same are characterized by rotatable mounting means for the lever providing swing work-clearing movement, in addition to the pivotal, work-clamping and releasing movement thereof and which further requires additional power means connected to the lever and operably coupled to the first power means for sequential operation of the lever movements for swinging into position before pivotal closing and preferably also for pivotal opening before swinging out. This device further includes two separate operating pistons and a housing formed by complex machining operations and additional means dependent on proper rotational positioning of the clamping lever before a secondary plunger positively engages the lever for clamping action.

U.S. Pat. No. 3,362,301 granted to Kohlitz on Jan. 9, 1968 discloses a fluid actuated clamp having a main piston for alternative axial movement of the shaft holding the work-engaging head and two transversely operating pistons for rotating the head as it is being raised or lowered upon release of the piston from interengagement with a tongue and groove An actuating mechanism for a work-engaging clamp was disclosed by Rowe in his July 29, 1969 U.S. Pat. 3,457,838, wherein there is disclosed simultaneous axial and rotational movement of the work-engaging head by means of a cam and cam follower. Similar cam operated members following a cam follower, either disposed directly on the piston shaft or in the wall of the bore slidably retaining the shaft, are shown in the U.S. patents granted to Sessody (assigned to the same assignee as the present invention) and bearing U.S. Pat. No. 3,572,216 with an issuing date of Mar. 23, 1971, a later issuing Sessody U.S. Pat. No. 3,605,569 granted Sept. 20, 1971, U.S. Pat. 3,948,502 granted Apr. 6, 1976 to Waller et al, U.S. Pat. No. 4,265,434 granted May 5, 1981 to Hamilton et al and U.S. Pat. No. 4,351,516 granted to Erosoy et al Sept. 28, 1982.

It is apparent from reviewing these patents that it is important to provide a means for both raising and lowering a work-engaging clamping head independently of means for rotating the head to facilitate insertion and removal of a workpiece relative to a supporting worktable. In addition, the present invention provides a means of minimizing the number of control ports, thereby minimizing hoses and valving which complicate plumbing, fixturing and are "chip traps" in machining operations, which often restrict the use of swing clamps.

Typical swing clamps only achieve two controlled positions (extend and retract) with two independent signals applied to respective control ports. Each of the prior art patents teach simultaneous and dependent operation of the work-engaging head with relation to its raising and lowering actuator means. The patents do not provide the versatility of independent operation which may be controlled by either sequential or selectively independent introduction of pressurized fluid to permit a variety of clamping positions as desired.

SUMMARY OF THE INVENTION

A powered work clamping device or swing clamp for holding a workpiece. The fluid operated work-engaging head may be retracted and extended and independently rotated by alternative or combined energization and de-energization of individually operated two-stage-pressure controlling valves and a pressure operated check valve communicating with and operated on energization of one of said valves. The independent clamping and rotational operations provide a very versatile device which may be readily used on automated machine tool production lines and on lines operated by recently introduced and widely used programmable controllers.

The swing clamp also provides a device with relatively short stroke due to independent control of means for extending and rotating of the work-engaging head.

The device includes a housing having an upper and a lower chamber and an intermediate chamber communicating with the upper and lower chambers. A piston operated plunger extends from an opening in the upper chamber and terminates at its distal end in a work-engaging head. The plunger, its head, and the upper piston are rotatable about a longitudinal axis between first and second positions and are arranged for axial movement between an extended and a retracted position. Means for rotating the plunger comprise an axial indexing bore in the plunger and the piston for axially slidably receiving a rotatable indexing shaft extending from a lower piston having a major diameter portion disposed in the lower chamber and a minor diameter section disposed in the intermediate chamber of the housing. An integral trunk member extends downwardly from the major diameter section and into the lower housing and includes a helical groove extending along its longitudinal axis. A plurality of balls reside in the groove and are engageable with a longitudinal groove in the wall of the lower chamber. Fluid inlet passageways communicate with the upper and lower chambers. A first passageway communicates with a first solenoid valve for admitting pressurized fluid to the upper chamber and below the under surface of the upper piston. The first passageway also communicates with the intermediate housing chamber to the minor diameter section of the lower piston upon energization of the first valve. A second passageway communicates with a second solenoid valve for admitting pressurized fluid to the upper chamber above the upper surface of the upper piston and to the lower chamber below the major diameter section of the lower piston upon energization of said second valve. There is also provided a pressure operated check valve interposed in the second passageway. A third passageway communicates with the first passageway and with the check valve to open the check valve under fluid pressure admitted during energization of the first valve and thereby permit entry of pressurized fluid to the underside of the lower piston. The lower piston and its indexing shaft are caused to rise and rotate via the plurality of balls coacting against the helical groove in the trunk and with the lower chamber longitudinal groove.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
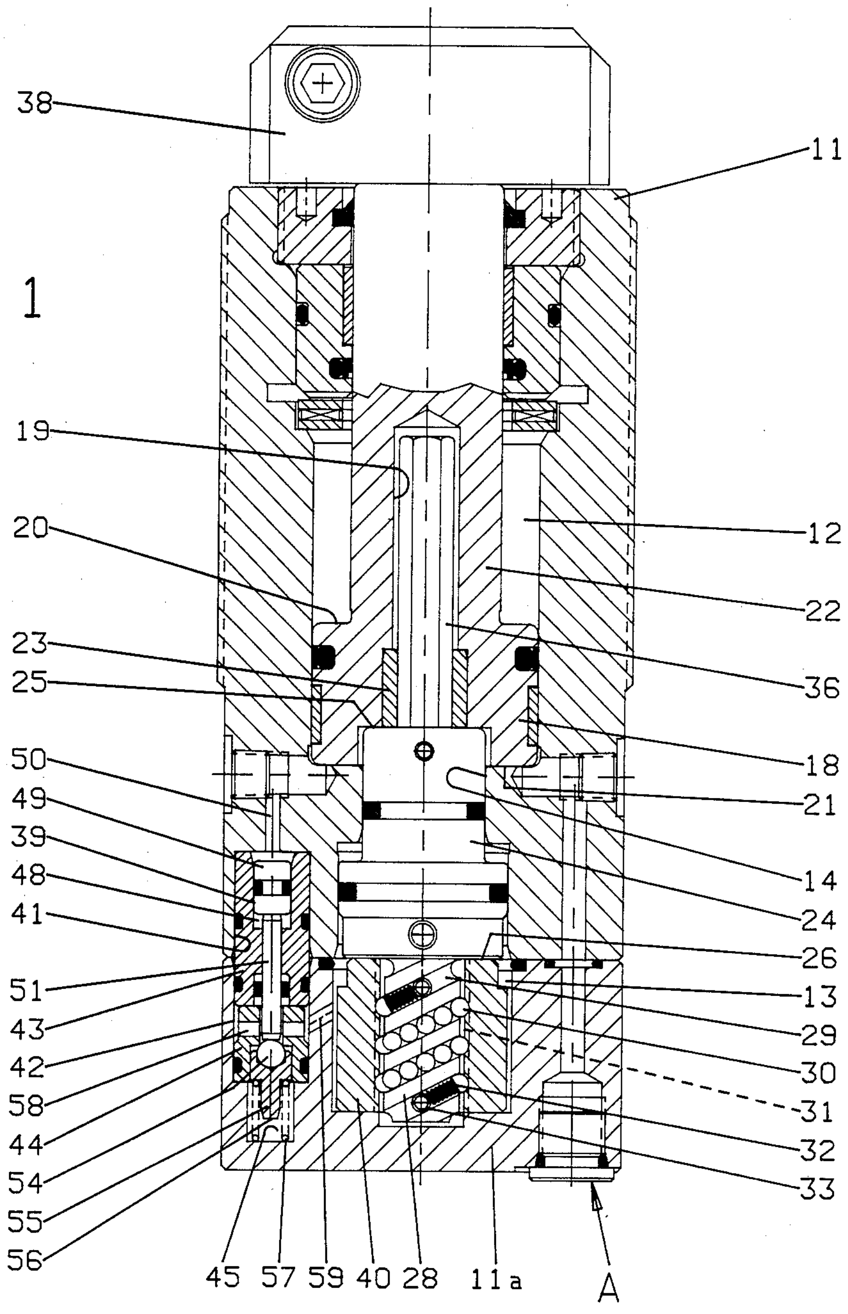
FIG. 1 is a cross-sectional side view, in elevation, of a swing clamp constructed in accordance with the principles of the present invention.

As shown in the drawings, the swing clamp of this invention includes a housing 11 defining an upper chamber 12 and a lower chamber 13 separated by an intermediate bore or chamber 14 of relatively reduced diameter. An upper piston 18 resides in the upper chamber 12. The piston 18 has a re-entrant axial indexing bore 19 and includes an upper working surface 20 and a lower working surface 21. The upper working surface 20 provides a working area of lesser dimension than the working area of the lower working surface 21 of piston 18. Piston rod or plunger 22 extends upwardly from the piston 18. A lower piston 24 operating in the bore 14 of the housing 11 and has an upper working surface 25 which is of lesser or minor diameter than the lower working surface 26. The lower portion of piston 24 and its lower working surface 26 operates in the lower chamber 13 of the lower housing member **11*a* secured to the housing 11. The lower working surface 26 of lower piston 24 is of greater working area than the working area of the upper surface 5. Extending below and fastened to the lower piston 4 is an elongated cylindrical trunk 28 having a continuous helical groove or race 29 receiving a plurality of balls 30. The balls 30 are arranged for axial sliding movement in diametrically opposed longitudinal grooves 31 in the bore of a stationary nut 40 to provide a means of rotation of the lower piston 24 in either direction as will hereinafter be described. Equalizing springs 32 assist in centering the balls 30. The opposite ends of the springs 32 abutt pins 33 extending outwardly from the lowermost and uppermost ends of groove 29 of the trunk 28**.

Attached to the uppermost end of the lower piston 4 is an indexing rod or shaft 36 having an hexagonal or splined cross section slidably received in a guide bushing 23 having a hexagonal cross section. The bushing 23 is secured within the indexing bore 19 of the upper piston 18. The distal end portion of the piston rod 22 of the upper piston 18 extends above the housing 11 and is secured to a work-engaging head 38.

Figure 2:
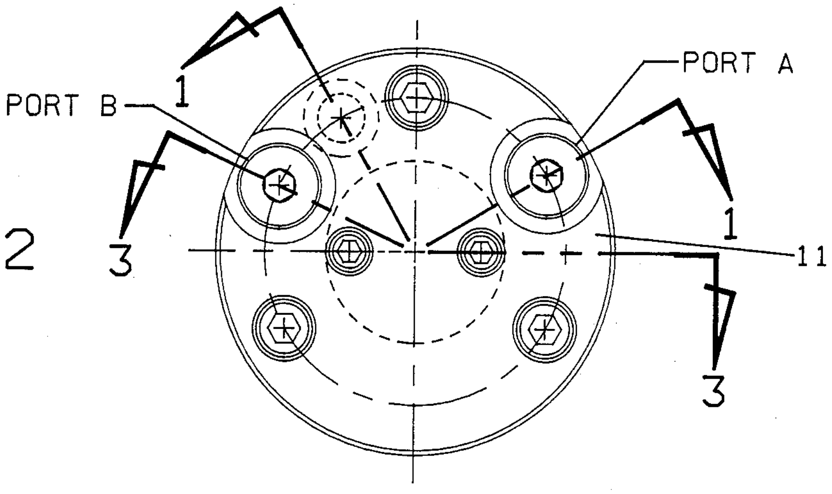
FIG. 2 is a bottom view of the swing clamp shown in FIG. 1, and further indicates sections 1—1 and 3—3 corresponding to the views of FIGS. 1 and 3.
Figure 3:
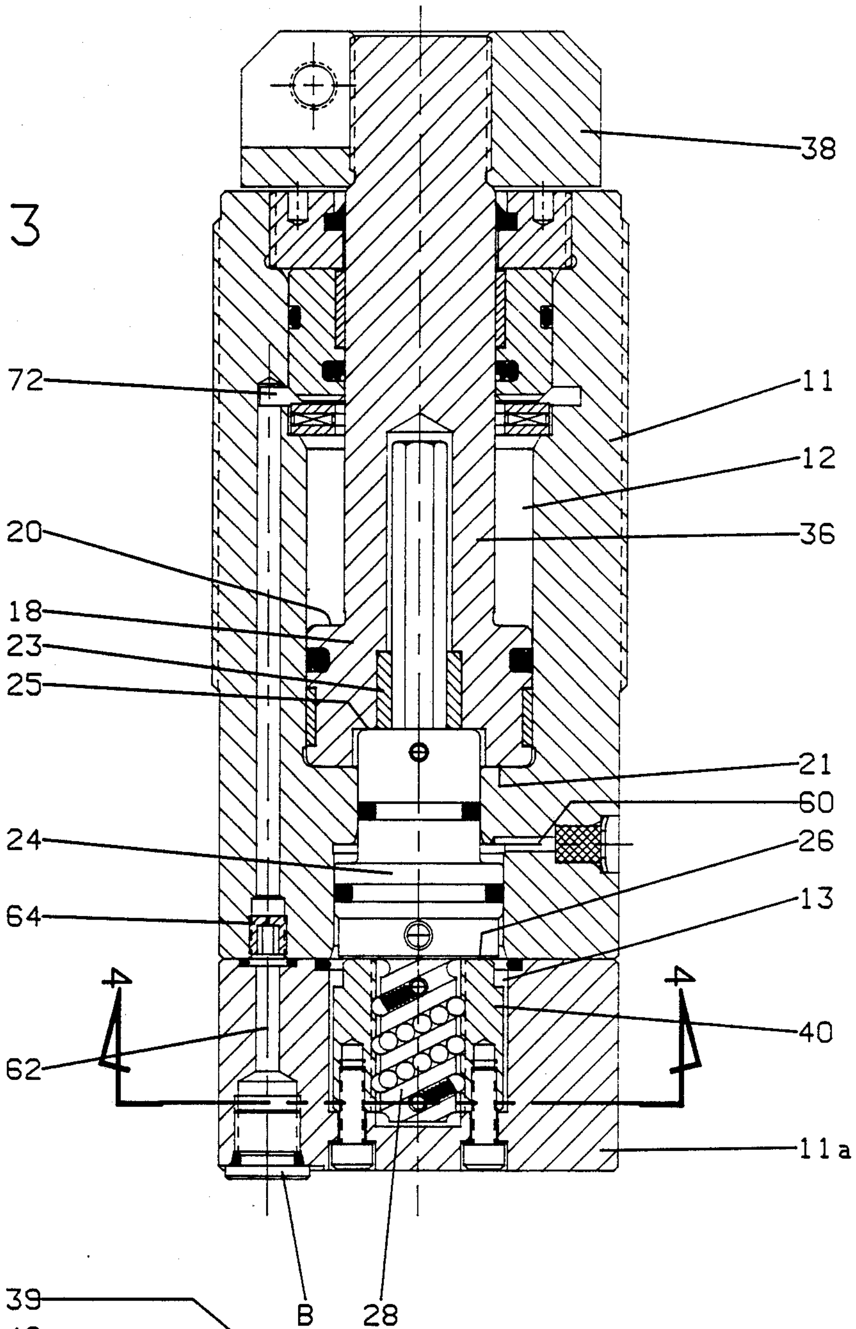
FIG. 3 is another cross-sectional view, in elevation, of the swing clamp taken along lines 3—3 of FIG. 2.
Figure 4:
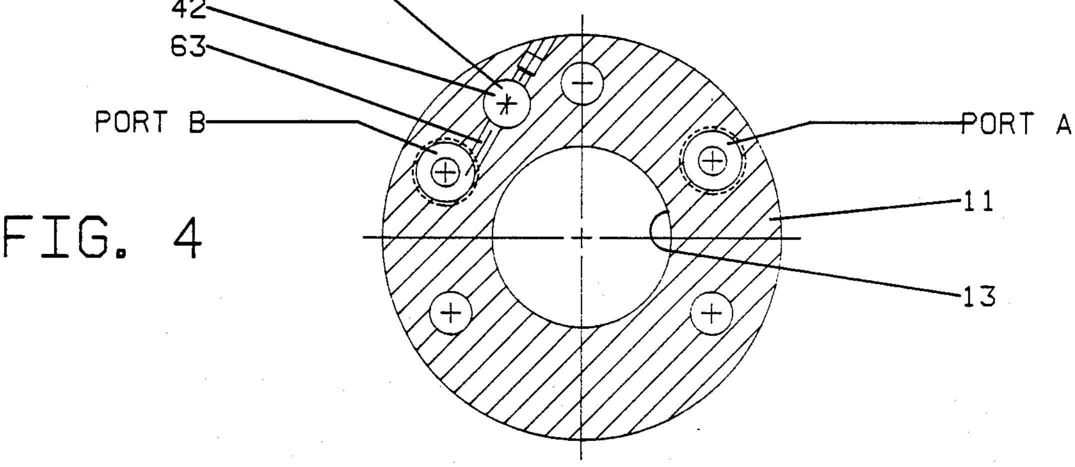
FIG. 4 is a cross-sectional view taken along lines 4—4 of FIG. 3.

The housing members 11 and **11*a* further include oppositely disposed, registering re-entrant bores 41 and 42 for receiving the components of a pressure operated check valve 39. The bores 41 and 42 receive abutting check valve upper and lower housings 43 and 4, respectively. The upper check valve housing 43 includes a re-entrant bore 48 containing a piston 49. The piston 49 communicates with a port A located at the bottom of housing portion 11*a* and operates the check valve 39 upon application of working pressure P via conduit 50. Attached below the piston 49 is a plunger 51 engageable at its lower end with a check valve ball 54 normally seated in a ball guide 55. The ball guide 55 has a spring guide portion 56 depending therebelow, and is surrounded by a helical spring 57. The lower check valve housing 44 contains a transverse conduit 58. The conduit 58 communicates with a conduit 59 extending into the chamber 13 of the lower housing member 11*a*. With reference to FIG. 3, there is shown an air escape vent 60 communicating with the lower chamber 13 and above the working surface of the major portion 26 of the lower piston 24. Also with reference to FIGS. 2, 3 and 4, it will be observed that hydraulic fluid port B is preferably located at the bottom of the lower housing portion 11*a*. Port B communicates via conduit 62 to an upper entry passage 72 in communication with the upper chamber 12 of the housing 11. It will be further noted that port B communicates with the bore or chamber 45 of the check valve via conduit 63 (see FIG. 4). There is disposed in conduit 13 a fluid restrictor 64** for purposes hereinafter described.

Next, with particular reference to FIGS. 5*a*, 5*b*, 5*c* and 5*d*, there will be described a clamp actuation sequence of the device of the present invention. The sequential steps are shown for purposes of illustration and understanding the operation, but the invention also provides the unique feature of permitting independent operation of the various stages. This action has been found desirable and often necessary for independent rotational and axial movement of the head 38 during special machining and other operations. The present invention teaches that this operation may be accomplished with only two control ports.

In the Home position (with power off) (See FIG. 5*a*) there is shown valves A and B respectively communicating with ports A and B, previously described. For purposes of meeting worldwide hydraulic standards, it is preferred to consider the Home position to be with power off, with both solenoid operated valves A and B being de-energized. It is to be further noted that, in the preferred embodiment, the valves A and B are both solenoid actuated, two-position three-way valves. For purposes of discussion, the letter "E" used throughout the various sequential stages indicates the energized state of a respective solenoid operated valve. Also, the letters "T" and "P" are utilized to designate tank and work pressure, respectively.

It will be noted that valves A and B are both in the de-energized state with tank pressure T being communicated to both ports A and B via conduits 70 and 71, respectively, as well as to conduit 72. In this state both the upper piston 18 and the lower piston 24 will be at rest at the bottom of their respective chambers 12 and 13. The work-engaging head 38 will be fully retracted in an opening 77 and below the surface of a work table 75. The work table supports a workpiece 76 resting thereon.

It will be observed that the pressure operated (P.O.) check valve 39 is in the closed state, thereby blocking entry of fluid to the lower surface 26 of the lower piston 24 via conduit 80. For ease in understanding operation of this invention, whenever the valve A is de-energized, the check valve will be in the closed state, thereby preventing entry of pressurized fluid from valve B. Operation of the check valve 39, as previously described, is by admission of working pressure P from valve A to the check valve 39 via the conduit 50.

The work-engaging head 38 is moved to the Extend position from its fully retracted Home position by energizing the solenoid of valve A with valve B remaining de-energized. Thus, as mentioned previously, the check valve 39 will be opened and working pressure P will be applied to the undersurface 21 of the upper piston 18. Since there is only tank pressure T present at conduits 72 and 80 communicating with port B, the upper piston 18 is free to raise its work-engaging head 38 without rotating above the workpiece 76. The lower piston 24 will remain in its lowermost position with pressure applied to its upper surface 25 and the upper piston 18 and its plunger portion 22 will be free to slide upwardly relative to the index rod 36.

Figure 5A:
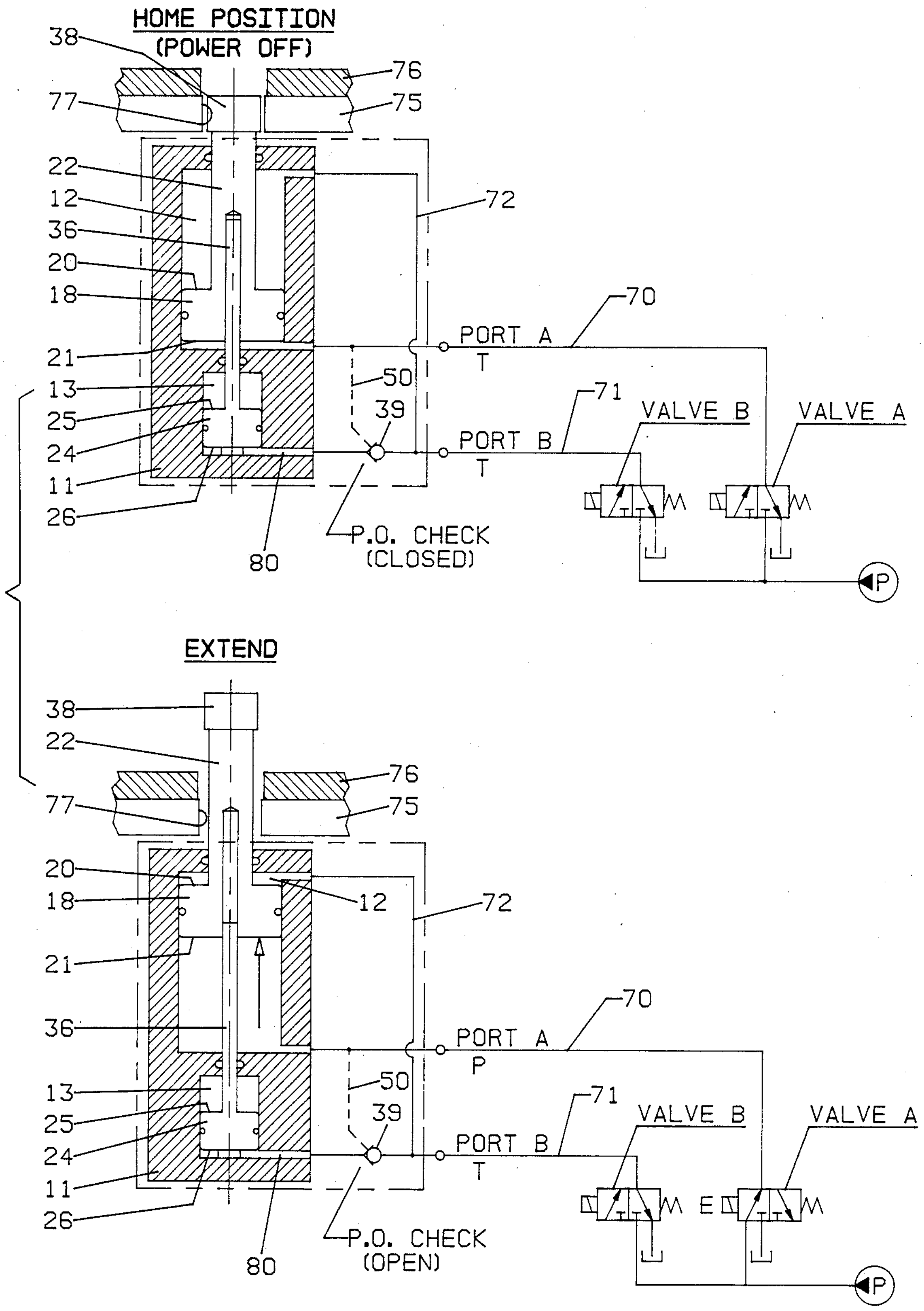
FIGS. 5*a*, 5*b*, 5*c*, and 5*d* together provide a schematic illustration of the operation and features of the present swing clamp.
Figure 5B:
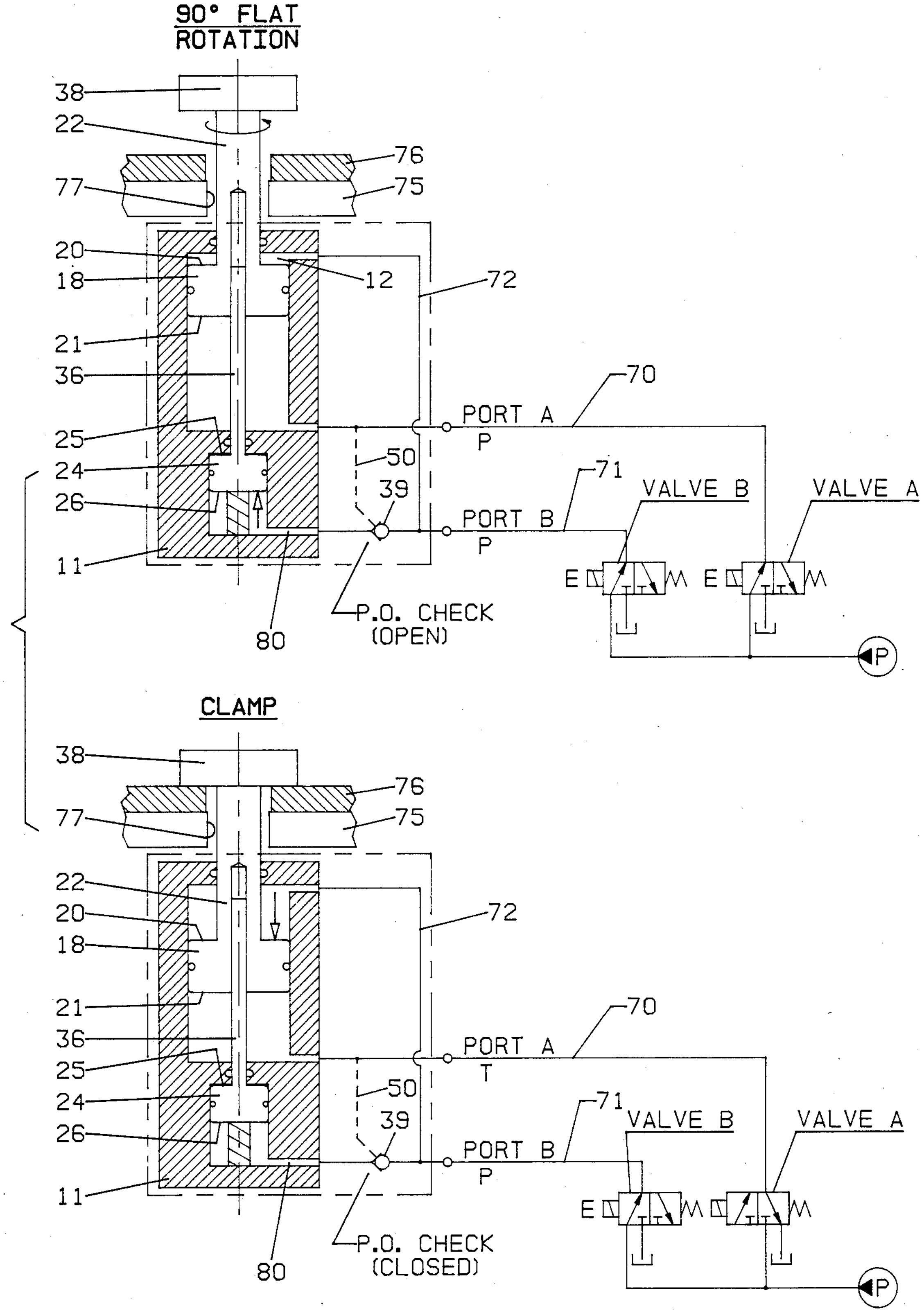

In order to retain the workpiece 76 in position, it is often preferred to rotate the work-engaging head 38 to extend over the workpiece 76 as shown in the next sequential state identified as "90° Flat Rotation"—FIG. 5*b*. Here, the upper piston 18 remains in its extended position to permit free rotation of the head 38. The operation is accomplished by energizing both valves A and B. In the sequence shown, valve A will have been previously energized, and remains in that state to support the upper piston 18 as shown. Working pressure P applied to conduit 72 from the now pressurized port B acts to maintain the piston 18 in its extended position. Since the surface area of the lower surface 21 of the piston 18 is larger than the upper surface area 20 of the piston 18, and equal pressure P is applied to both surfaces 21 and 20, there is a greater force acting on the bottom surface 21 which tends to extend piston 18. Since piston 18 is fully extended, piston 18 remains in its same position when valve B is energized. The check valve 39 will remain open and work pressure P will be applied via conduit 71 from valve B to port B to the lower surface 26 of the lower piston 24. Pressure P against the lower surface 26 of the piston 24 causes the piston 24 to extend by virtue of differential areas of the upper surface 25 and lower surface 26 of piston 24, as previously described for piston 18. The piston 24 will be caused to rotate by virtue of the forces exerted on the balls 30 positioned in the helical groove 29 of the rotatable trunk 28 and against the grooves 31 of the stationary lower housing nut or member 40 (see FIGS. 1 and 3).

In the Clamp position the workpiece 76 will be clamped to the worktable 75 with the work-engaging head 38 having been rotated 90 degrees during the previous stage. Clamping action is provided by de-energizing valve A, but with valve B remaining energized. Thus, tank pressure T will be presented to the lower surface 21 of the upper piston 18 and the check valve 39 will be moved to the closed position, thereby leaving the lower piston 24 in its former state without any working pressure P being applied thereto. However, working pressure P will be applied to conduit 72 and against the upper surface 20 of the upper piston 18 to force the piston and work-engaging head 38 downwardly and thereby clamp the workpiece 76 against the supporting table surface 75.

Figure 5C:
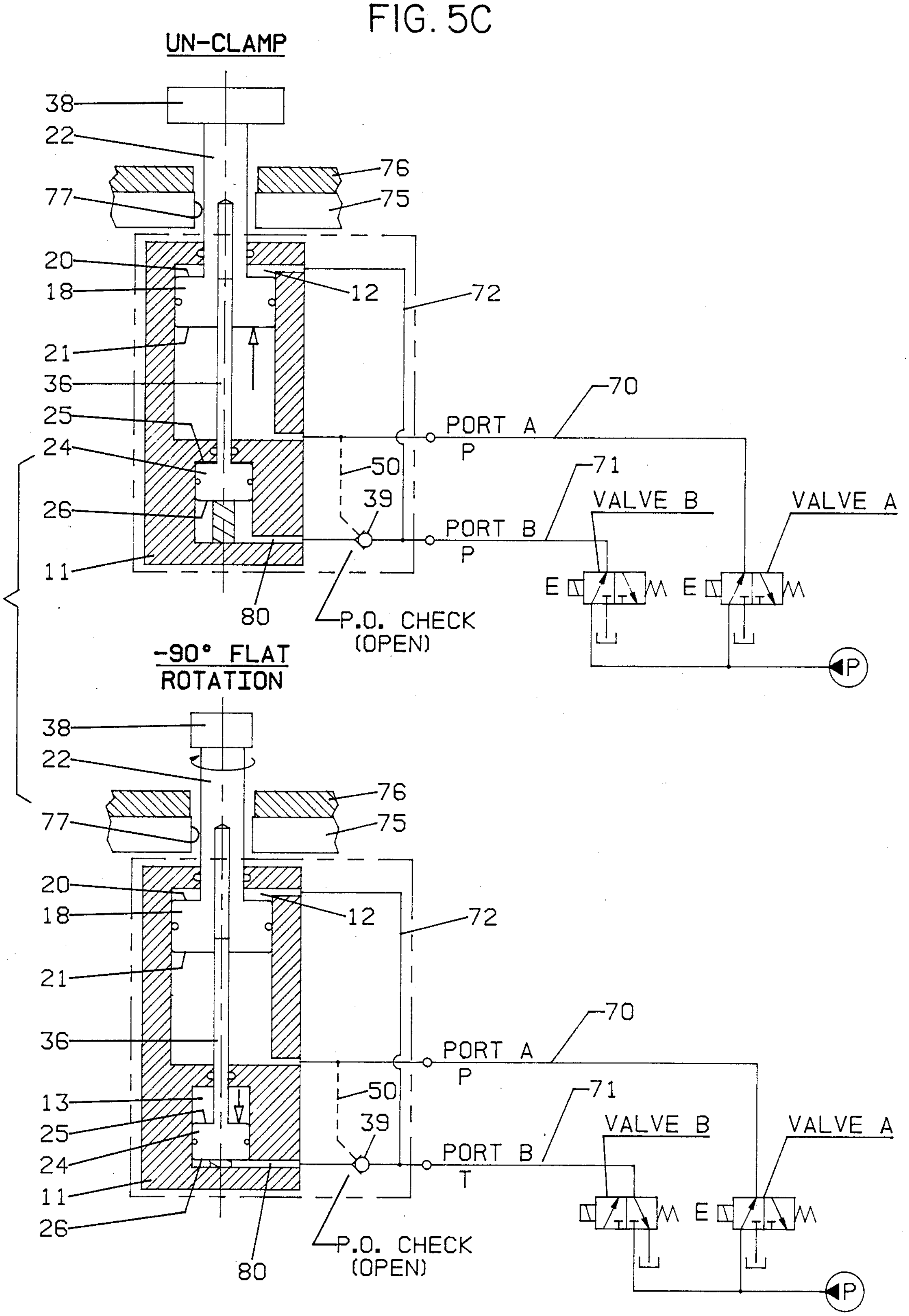

With reference to the sequential views of FIG. 5*c*, after the milling or other operation has been completed on the workpiece 76, and it is intended to remove the workpiece, the swing clamp may be operated to the Unclamp position. In order to accomplish this operation, both valve A and valve B will be energized. Working pressure P, accordingly will be applied to both ports A and B and to conduits 70, 71 and 72, respectively. Since valve A has been previously energized, working pressure P will be applied to the check valve 39 via conduit 50 to open the same and thereby permit working pressure P to be applied to the undersurface 26 of the lower piston 24 via conduit 80, causing it to remain in its upward position. The upper piston 18 and the work-engaging head 38 will now be caused to raise to its uppermost position as previously described by differential area movement. Working pressure P is applied to both the undersurface 21 and the upper surface 20. Even though the valve action of this Unclamp stage is identical with that of the "90° Flat Rotation" , stage, with the upper piston 18 being in an intermediate position in the upper chamber 12, will rise to unclamp the workpiece 76. This is contrasted with the operation in "90° Flat Rotation" where the piston 18 was at its uppermost position of chamber 12 from the previous Extend stage.

Referring next to the "−90° Flat Rotation" stage, after the work-engaging head 38 has been unclamped from the workpiece 76, it is usually desired to rotate the head back to its normal position for seating in the opening of the work table 75. In this case, working pressure P will be released by de-energizing valve B, but with valve A remaining in the energized position to apply a working pressure P to lower surface 21 of the upper piston 18 and to the upper surface 25 of the lower piston 24 to force the lower piston 24 downwardly and rotatably due to motion of the rotatable trunk 28, and thereby cause the index rod 36 to rotate along with the upper piston 18 and its working head 38.

It will be observed that although working pressure P is applied to both ports A and B, both here and will later be explained in connection with the Unclamp position, there will be lesser force applied to the upper surface 25 of the lower piston 24 than that applied to the lower surface 26 since, as previously described, the upper surface 25 is of comparatively lesser diameter than the diameter of the lower surface 26. This presents a differential of force under Pascal's Law, which states that pressure in a container is equal in all directions, and that Force=Pressure×Area. Since the areas are different, different forces will be present on the piston.

Figure 5D:
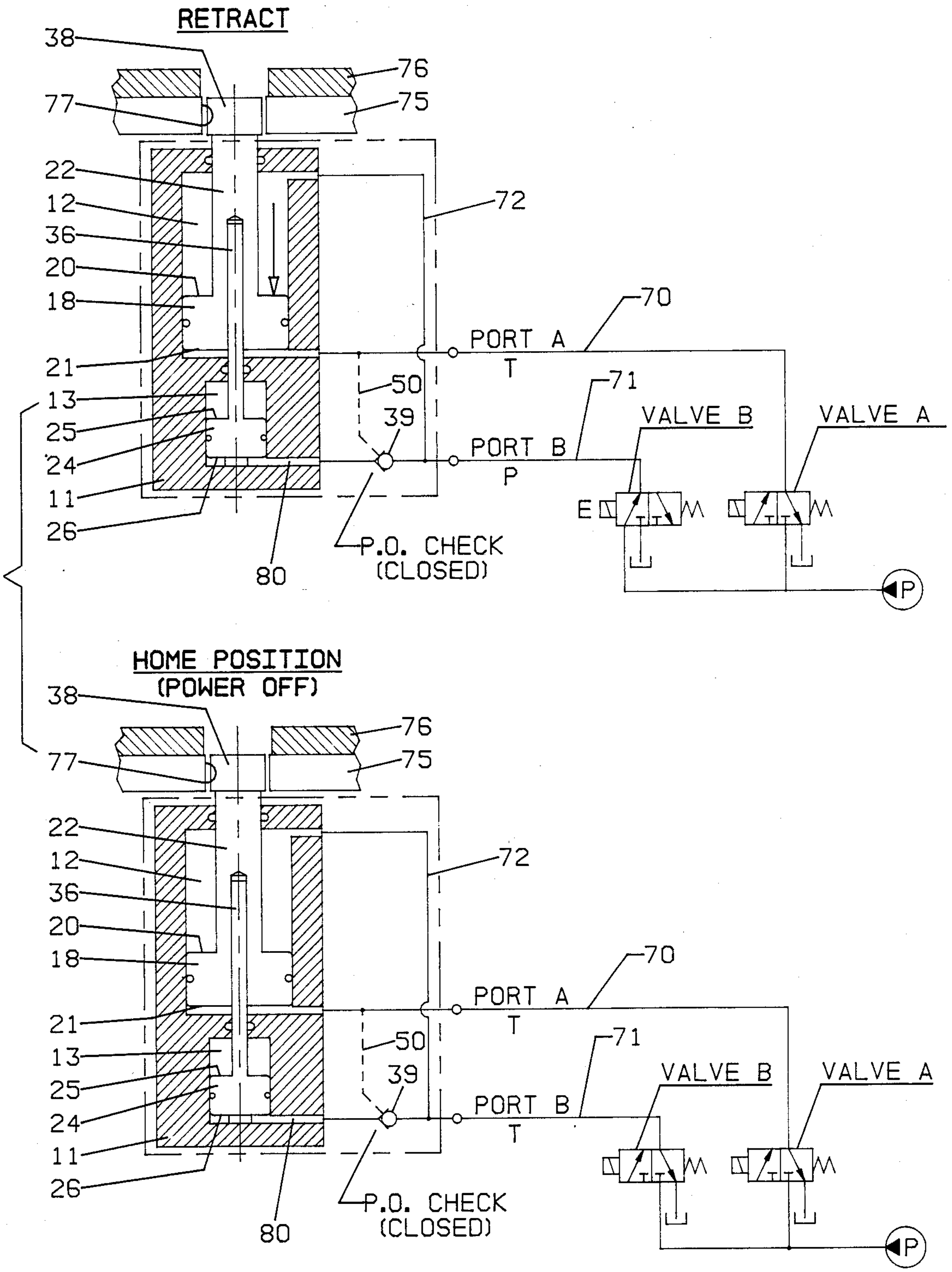

Next, with reference to the Retract stage—FIG. 5*d*, in order to retract the working head 38 within the opening 77 of the table 75 and out of the way of the workpiece 76, valve B is energized and valve A is de-energized to thereby expose tank pressure T to the under surface 21 of the upper piston 18 and working pressure P on its upper surface 20 to force the piston 18 downwardly. Since the lower piston 24 has been forced downwardly during the previous stage, it will remain at its lowest position with the check valve 39 closed after de-energization of valve A.

With power turned off, both valves A and B will be de-energized and the entire sequence will have been completed with all working components being as shown in the original Home position.

The flow restricter 64 positioned in the conduit 62 communicating with port B is provided to restrict the effects of tank back pressure.

The present invention provides a swing clamp with individual and independent stages of operation. That is, there is no simultaneous rotational and axial movement of the upper piston 18 and its working head 38 as in past devices, which required relatively complex construction and friction-adding spiral cam surfaces and other camming means necessary for simultaneous operation. The advantages of independent operation will be apparent when one realizes that clamping must often be done through a T-slot, open only at its lower surface. Here, the working head must fit into an elongated aperture which will be rotated past a shoulder inwardly of the workpiece or clamp for the workpiece. Further, it is often desirable to move milling cutters very close to the work-engaging head. The present invention permits the head 38 to be rotated 90 degrees and present a side of lesser dimension, when desired, for close passage of a milling cutter. This may be done with minimal unclamping and reclamping action and independent operation of the components by means of independent operation of valves A and B. Some machining operations require the full retraction of the head 38 of the present swing clamp to allow the cutter to pass by before reclamping. This is impossible with conventional swing clamps. Also, modern programmable controllers may be utilized to program the actions of valves A and B independently of one another to obtain the desired function either sequentially as described above or in an independent manner as desired.

I claim:

1. A powered work clamping device, comprising:

a housing having an upper and a lower chamber and an intermediate chamber communicating with said upper and lower chambers;

a plunger extending from the housing and adapted to support a work-engaging member at its extending end and an upper piston at its other end, said upper piston being disposed within said upper chamber, said plunger mounted for relative movement about its longitudinal axis between first and second positions and for axial movement between extended and retracted positions;

a lower piston having a major diameter portion disposed in said lower chamber and a minor diameter section disposed in the intermediate chamber of said housing;

indexing means for rotating said plunger between said first and second position;

fluid inlet passageways communicating with said upper and lower chambers and including a first passageway;

a first actuating means communicating with said first passageway for admitting fluid to the upper chamber and below the undersurface of said upper piston and into the intermediate housing chamber to the surface of said minor diameter section of said lower piston upon operation of said first actuating means;

check valve means;

a second passageway; and a second actuating means communicating with said second passageway for admitting fluid to said upper chamber above the upper surface of said upper piston and to the lower chamber through said check valve means and below the major diameter section of said lower piston;

said check valve means adapted for restricting fluid from entering the lower chamber from the second actuating means and movable towards fluid restricting position upon non-operation of said first actuating means.

2. The clamping device of claim 1, wherein said fluid is pressurized.

3. The clamping device of claim 1, wherein the first and second actuating means respectively comprise directional control valves.

4. The clamping device of claim 3, wherein the directional control valves are solenoid operated valves.

5. The clamping device of claim 1, wherein the indexing means for rotating the plunger between said first and second position comprise an axial indexing bore in said plunger and said piston, said bore slidably receiving a rotatable indexing shaft and arranged to rotate with said shaft, and an integral trunk member extending downwardly from the major diameter section of said lower piston and into said lower chamber, said trunk member including a helical groove extending along its longitudinal axis, a plurality of balls residing in said groove and engageable with a longitudinal groove in said lower chamber.

6. The clamping device of claim 5, wherein the pressure operated check valve means is interposed in the second passageway, and a third passageway communicates with said first passageway and with said check valve to thereby open said check valve under fluid pressure admitted during operation of said first actuating means and thereby permit entry of fluid to the underside of the lower piston, whereby said lower piston and its indexing shaft are caused to move in an axial direction and simultaneously rotate via the plurality of balls coacting against the said helical groove in said trunk and with the longitudinal groove in said lower chamber.

7. The clamping device of claim 6, wherein the check valve means includes a housing defining a longitudinal chamber, a piston in said chamber having a surface communicating with and responsive to fluid pressure admitted to said third passageway, a ball member seated in a cup member and biased towards closure of a fourth passageway admitting fluid pressure from said second valve to the underside of said lower piston, said check valve piston operable under fluid pressure and against the biased ball member to open said fourth passageway.

8. The clamping device of claim 6, wherein the first and second actuating means respectively comprise directional control valves.

9. The clamping device of claim 8, wherein the directional control valves are solenoid operated valves.

10. The clamping device of claim 8, wherein the solenoid valves are connected to a source of fluid under pressure.

* * * * *